United States Patent [19]

Kojima et al.

[11] Patent Number: 4,936,342

[45] Date of Patent: Jun. 26, 1990

[54] FUEL PRESSURE CONTROL VALVE DEVICE

[75] Inventors: Yasushi Kojima; Tohru Kato, both of Kiryu, Japan

[73] Assignee: Mitsuba Electric Manufacturing Co., Ltd., Gunma, Japan

[21] Appl. No.: 300,347

[22] Filed: Jan. 23, 1989

[30] Foreign Application Priority Data

Jan. 27, 1988 [JP] Japan .............................. 63-10026[U]
Feb. 22, 1988 [JP] Japan .............................. 63-22283[U]
Feb. 22, 1988 [JP] Japan .............................. 63-22284[U]

[51] Int. Cl.$^5$ ............................................ G05D 16/08
[52] U.S. Cl. .................................... 137/510; 123/463; 251/126
[58] Field of Search .................... 137/509, 510, 505.42; 251/118, 126; 123/460, 463

[56] References Cited

U.S. PATENT DOCUMENTS

| | | | |
|---|---|---|---|
| 1,547,962 | 7/1925 | Seewer | 251/118 X |
| 2,172,935 | 9/1939 | Ewart | 251/118 |
| 3,013,790 | 12/1961 | Anderson et al. | 137/510 X |
| 4,284,039 | 8/1981 | Bellicardi et al. | 137/510 X |
| 4,349,043 | 7/1982 | Christensen | 137/505.42 |
| 4,559,968 | 12/1985 | Strohl et al. | 137/510 |
| 4,660,597 | 4/1987 | Cowles | 137/505.42 |

FOREIGN PATENT DOCUMENTS 18678 1/1985 Japan .................................. 137/510

Primary Examiner—Stephen M. Hepperle
Attorney, Agent, or Firm—Rodman & Rodman

[57] ABSTRACT

A fuel pressure control valve device comprising: a case; a fuel introducing port and a fuel discharge port; a diaphragm dividing the interior of the case into two chambers; an armature; a resilient member; a pole constituting a fuel passage for discharging fuel; and a sphere as a valve body for opening or closing the fuel passage in the pole. The fuel passage in the pole includes: a fuel passage for guiding the sphere; a valve seat to be abutted against the sphere; and a resilient member for giving a biasing force to the sphere to abut the sphere against the armature. Auxiliary fuel passages are formed in or on the wall of the fuel passage for guiding the sphere. A spring seat is provided at the outer peripheral portion thereof with a stepped portion which receives a coil spring.

10 Claims, 6 Drawing Sheets

FUEL PRESSURE CONTROL VALVE DEVICE

BACKGROUND OF THE INVENTION

1. Field of the Invention

This invention relates to fuel pressure control valve devices, and more particularly to a fuel pressure control valve device effective in regulating pressure of fuel fed to an injection valve used in a fuel injection system for a vehicle.

2. Related Art Statement

In a vehicle such as an automobile, a fuel pressure control valve device is used as a device for controlling pressure of fuel fed to a fuel injection valve to a predetermined level. For example, this device is constructed such that pressure of fuel fed to the fuel injection valve is regulated in accordance with intake air pressure and a fuel flow rate injected through the fuel injection valve is always kept adjusted for the operating conditions.

Heretofore, there has been known a fuel pressure control valve device in which a sphere is used as a valve body of a control valve as disclosed in Japanese Utility Model Laid-Open No. 53-44325 and Utility Model Publication No. 62-24145.

As shown in FIG. 10, a valve body of sphere 6 is disposed between an armature 2, which is supported by a diaphragm 1 and movable in a fuel chamber, and a pole 3, in which a fuel passage 4 is formed for leading the fuel in the fuel chamber to a fuel discharge port. The sphere 6 is mounted in or demounted from a valve seat 5 formed in the intermediate portion of a fuel passage 4, in accordance with the movement of the armature 2, thus the fuel passage 4 being opened or closed. With this arrangement, the control valve can be simplified in construction.

However, in the conventional fuel pressure control valve device as shown in FIG. 10, the sphere 6 tends to be shifted laterally and to miss the place when the sphere 6 is moved in the valve seat 5 by the biasing force of a spring 7 for constantly urging the sphere 6 against the armature 2, thus resulting in inferior flow rate-pressure characteristics. In other words, a fuel commensurate with the pressure may not be discharged. This is because the sphere 6 is inserted in the conical valve seat 5 to be mounted thereto or demounted therefrom.

Another type of conventional fuel pressure control valve device is shown in FIG. 11. This valve device is constructed such that a valve seat 5a is formed of a circular edge, a conical guide hole 8 is formed on the armature 2, and the sphere 6 can be mounted in the valve seat 5A or demounted therefrom in a state of being inserted in the guide hole 8.

However, even with this fuel pressure control valve device, the sphere 6 tends to be shifted laterally and thus to miss the place when the armature 2 moves, thereby presenting the disadvantage of inferior flow rate-pressure characteristics similarly to the one shown in FIG. 10. In other words, the fuel flow rate commensurate with the pressure may not be attained.

Therefore, to obviate the problems, it can be proposed, as shown in FIG. 5, to form a fuel passage 34' in the top portion of the valve seat for slidably receiving a sphere 38' and guiding the sphere, and to form a plurality of longitudinal channels 39' as auxiliary fuel passages. The channels 39' are cuttingly provided in the side wall of the fuel passage 34', for preventing the lateral shift of the sphere and securing satisfactory flow of the fuel.

However, it has been made clear by the inventor of the present invention that, when the longitudinal channels 39' are provided along the normal lines, as shown in FIG. 5, fuel flows which have passed through these longitudinal channels 39' run against one another, thus causing turbulent flows as indicated by broken line arrows, thereby resulting in inferior flow rate-pressure characteristics. This phenomenon is remarkable, in particular, during a high flow rate.

Another undesirable aspect of the conventional device is pointed out as follows.

As a conventional fuel pressure control valve device, there is a fuel pressure control valve device comprising: a case constituting therein a fuel chamber and a pressure chamber; a fuel introducing port and a fuel discharge port, which are both opened on the side of the fuel chamber of the case; a pressure introducing port opened on the side of the pressure chamber of the case; a diaphragm stretchingly provided between the fuel chamber and the pressure chamber so as to divide the interior of the case into two chambers; an armature supported by the diaphragm and inserted into the fuel chamber; a coil spring provided in the pressure chamber so as to bias the armature toward the fuel chamber; a pole provided so as to form therein a fuel passage for leading the fuel in the fuel chamber to the fuel discharge port of the case; and a valve body disposed between the pole and the armature, for opening or closing the fuel passage in the pole in accordance with the movement of the armature.

In the above-described fuel pressure control valve device, the end of the coil spring on the side of the armature is received by a spring seat, and this spring seat is brought into abutting contact with the top surface of the diaphragm so as to be joined with the armature, so that the spring seat can be moved integrally with the diaphragm and the armature.

However, in the above-described fuel pressure control valve device, if the spring seat has a small diameter, then the diameter of winding of the coil spring becomes small, whereby a spring constant is raised to have an unfavorable pressure gradient, thereby lowering a rate of damping, or, in other words, lowering efficiency of pulsation absorptive action of the fuel pressure control valve device. On the other hand, when the spring seat is formed to have a large diameter, an allowance for deformation of the diaphragm comes to be small, thereby, also lowering the rate of damping.

SUMMARY OF THE INVENTION

It is an object of the present invention to provide a fuel pressure control valve device which is capable of holding the moving direction of a sphere constituting a valve body in a predetermined direction.

It is another object of the present invention to provide a fuel pressure control valve device which is capable of preventing flow rate-pressure characteristics from becoming inferior.

It is a further object of the present invention to provide a fuel pressure control valve device which is capable of raising a rate of damping while being simplified in construction.

The fuel pressure control valve device according to the present invention is a device comprising: a case constituting therein a fuel chamber and a pressure chamber; a fuel introducing port and a fuel discharge port, which are opened on the side of the fuel chamber of the case; a pressure introducing port opened on the side of the pressure chamber of the case; a diaphragm stretchingly provided between the fuel chamber and the pressure chamber so as to divide the interior of the case into two chambers; an armature supported by the diaphragm and inserted into the fuel chamber; a resilient member for biasing the armature toward the fuel chamber; a pole provided so as to form therein a fuel passage for leading the fuel in the fuel chamber to the fuel discharge port of the case; and a sphere disposed between the pole and the armature, for opening or closing the fuel passage in the pole in accordance with the movement of the armature; characterized in that the fuel passage of the pole includes: a fuel passage for guiding the sphere, with the diameter thereof being slightly larger than the diameter of the sphere, thus to allow the sphere to be slidable therein; a valve seat formed to have a diameter smaller than that of the fuel passage, for abuttingly contacting the sphere to prevent the fuel from flowing out; and a fuel passage for discharging the fuel, being opened for leading the fuel from this valve seat to the fuel discharge port of the case; and the sphere is slidably inserted into the fuel passage for guiding the sphere and a resilient member for giving a biasing force for constantly contacting the sphere with the armature is provided in the fuel passage for discharging the fuel.

According to the above-described fuel pressure control valve device, when the fuel is introduced into the fuel chamber and the pressure is introduced in the pressure chamber, the position of the armature is determined under the balance between the fuel pressure in the fuel chamber and the intake air pressure in the pressure chamber together with the biasing force of the resilient member, and, in turn, the sphere moves in the fuel passage in accordance with the position of the armature. Then, the fuel in the fuel chamber is discharged from the fuel discharge port in accordance with the position of the sphere. The sphere moves within the passage for guiding the sphere, so that the moving direction of the sphere is regulated in a predetermined direction. For this reason, a predetermined flow rate of fuel is constantly discharged in accordance with the position of the armature, so that deterioration of the flow rate-pressure characteristics can be prevented.

Furthermore, according to the present invention, auxiliary fuel passages are formed in the side wall of the fuel passage for guiding the sphere, and the extensions of the flow lines of the auxiliary fuel passages are deviated from the center of the fuel passage for guiding the sphere, so that, when fuel flows through the auxiliary, fuel passages, whirl flow is generated.

Because of this whirl flow, the fuel flows through the fuel passage without causing turbulent flows.

For this reason, the predetermined flow rate is constantly discharged in accordance with the position of the armature, so that deterioration of the flow rate-pressure characteristics can be prevented.

Further, as another aspect of the present invention, the fuel pressure control valve device according to the present invention is a fuel pressure control valve device comprising: a case constituting therein a fuel chamber and a pressure chamber; a fuel introducing port and a fuel discharge port, which are opened on the side of the fuel chamber of the case; a pressure introducing port opened on the side of the pressure chamber of the case; a diaphragm stretchingly provided between the fuel chamber and the pressure chamber so as to divide the interior of the case into two chambers; an armature supported by the diaphragm and inserted into the fuel chamber; a coil spring provided in the pressure chamber so as to bias the armature toward the fuel chamber; a pole provided so as to form therein a fuel passage for leading the fuel in the fuel chamber to the fuel discharge port of the case; and a valve body disposed between the pole and the armature, for opening or closing the fuel passage in the pole in accordance with the movement of the armature; characterized in that the spring seat is provided at the outer peripheral portion thereof with a stepped portion being separated from the diaphragm, and this stepped portion is adapted to receive the coil spring.

According to the fuel pressure control valve device with this construction, the outer peripheral portion of the spring seat is separated from the diaphragm by a dimension in which the stepped portion is formed, whereby the diaphragm has its own allowance for deformation increased at the peripheral portion thereof by this dimension. The allowance for deformation is increased in this way, whereby the diaphragm can easily follow up a change in pressure, so that the rate of damping can be improved.

On the other hand, the coil spring is received by the stepped portion positioned at the outer peripheral portion of the spring seat, so that the diameter of winding of the coil spring is not limited to small value. Accordingly, the spring constant of the coil spring is set at a low value, whereby the pressure gradient is improved, so that the rate of damping can be further improved.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENTS

Figure 1:
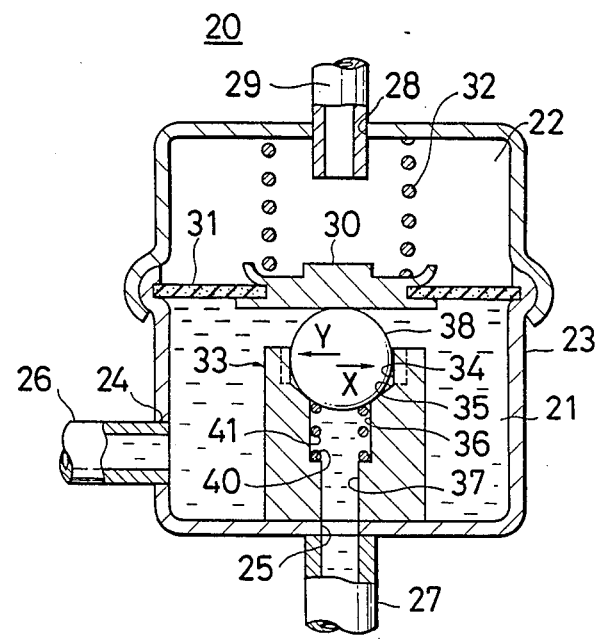
FIG. 1 is a longitudinal sectional view showing one embodiment of the fuel pressure control valve device according to the present invention.
Figure 2:
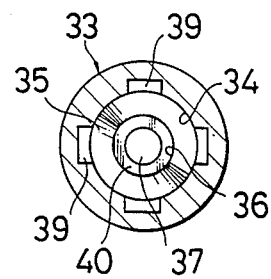
FIG. 2 is a sectional view of the fuel passage thereof.

In the embodiment shown in FIGS. 1 and 2, a pressure regulator 20 as being the fuel pressure control valve device comprises a case 23 including a fuel chamber 21 and a pressure chamber 22. Opened in the side wall of this case 23 on the side of the fuel chamber 21 is a fuel introducing port 24, and opened in the bottom wall is a fuel discharge port 25.

Connected to the fuel introducing port 24 is a pipe 26 as being a fuel introducing pipe. This pipe 26 is connected to the intermediate portion of a fuel passage (not shown) for feeding under pressure the fuel in a fuel tank (not shown) to a fuel injection valve (not shown) by pump (not shown). The fuel is introduced into the fuel chamber 21 through this pipe 26. Connected to the fuel discharge port 25 is a pipe 27 as being a discharge pipe. This pipe 27 is connected to the fuel tank so that the fuel in the fuel chamber 21 is returned to the tank through the pipe 27.

On the other hand, opened in the ceiling wall of the pressure chamber 22 of the case 23 is a pressure introducing port 28, to which is connected a pipe 29 as being a pressure introducing pipe. The pipe 29 is connected to the intermediate portion of an engine intake piping (not shown), so that intake air pressure is introduced into the pressure chamber 22 through the pipe 29.

Furthermore, movably, stretchingly provided in the case 23 to divide the interior of the case into two including the fuel chamber 21 and the pressure chamber 22 is a diaphragm 31, the outer peripheral portion of which is fixed to the inner wall surface of the case 23. Floatingly supported by the diaphragm 31 is an armature 30 which is biased toward the fuel chamber 21 by a compression spring 32 as being a resilient member inserted into the pressure chamber 22.

Concentrically fixed to the fuel discharge port 25 formed at the bottom portion of the case 23 is a pole 33 to form therein a fuel passage. The pole 33 is of a generally columnar shape and a fuel passage is formed through the center of the pole 33. A fuel passage 34 for guiding a sphere 38 as a valve body is opened at one end portion of the pole in a manner to be slightly larger than the diameter of the sphere 38 to receive therein the sphere 38 in slidable manner. As shown in FIG. 2, a plurality of channels 39 constituting auxiliary fuel passages are cuttingly formed in the side wall of this fuel passage 34 generally equidistantly in the circumferential direction and extended vertically. Conically opened at the bottom end of this fuel passage 34 is a valve seat 35 which is downwardly tapered with respect to the fuel passage 34, the sphere 38 being brought into abutting contact with the valve seat 35 to prevent the fuel from flowing out. Fuel passages 36 and 37 for discharging fuel are opened downwardly of the valve seat 35, and a stepped portion 40 is formed between the fuel passages 36 and 37. A spring 41 as being a resilient member is mounted on this stepped portion. The spring 41 is arranged to give a biasing force for constantly, abuttingly contacting the sphere 38 with the armature 30.

Action of this embodiment will hereunder be described.

When the fuel is introduced into the fuel chamber 21 through the pipe 26 and the intake pressure is introduced into the pressure chamber 22 through the pipe 29, under the balance between the fuel pressure in the fuel chamber 21 and the intake pressure in the pressure chamber together with the biasing force of the spring 32, the position of the armature 30 is determined, whereby the sphere 38 moves in the fuel passage 34 for guiding the sphere in accordance with the position of the armature 30. Then, a fuel flow rate commensurate whith the position of this sphere 38 is discharged from the fuel discharge port 25. At this time, the sphere 38 is vertically moved while being prevented from lateral movement in directions indicated by arrows X and Y by the fuel passage 34 for guiding the sphere, and moves in this fuel passage into abutting contact with the armature 30 by a biasing force of a spring 41. In short, in its valve action, the sphere 38 is prevented from moving in the directions indicated by the arrows X and Y, so that the moving direction of the sphere 38 is constantly held in a predetermined direction (vertical direction). As a result, stabilized flow rate-pressure characteristics can be secured.

When the sphere 38 is seated in the valve seat 35 due to its movement, the fuel is prevented from flowing out, whereby a valve-closed state is brought about. Punching work can be applied to the surface of seating of the valve seat 35 so that the surface may match the curved surface of the sphere, then sealing properties of the valve seat by the abutting contact between the sphere 38 and the valve can be further improved.

In the above embodiment, since the channels 39 are formed in the side wall of the fuel passage for guiding the sphere, even if a clearance formed between the sphere 38 and the fuel passage 34 for guiding the sphere is small, a large fuel flow rate can be discharged through the channels 39.

As described above, according to the embodiment shown in FIGS. 1 and 2, since the moving direction of the sphere can be held in the predetermined direction, a stabilized fuel flow rate can be discharged in accordance with the position of the armature, thereby contributing the stabilization of the flow rate-pressure characteristics.

Figure 3:
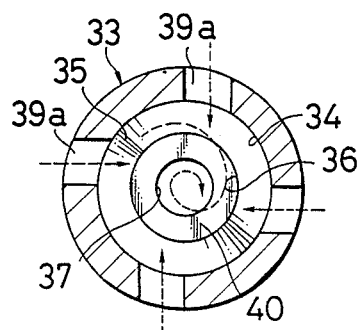
FIG. 3 is an enlarged partially sectional view taken along the line I—I in FIG. 4, showing another embodiment of the fuel pressure control valve device according to the present invention.
Figure 4:
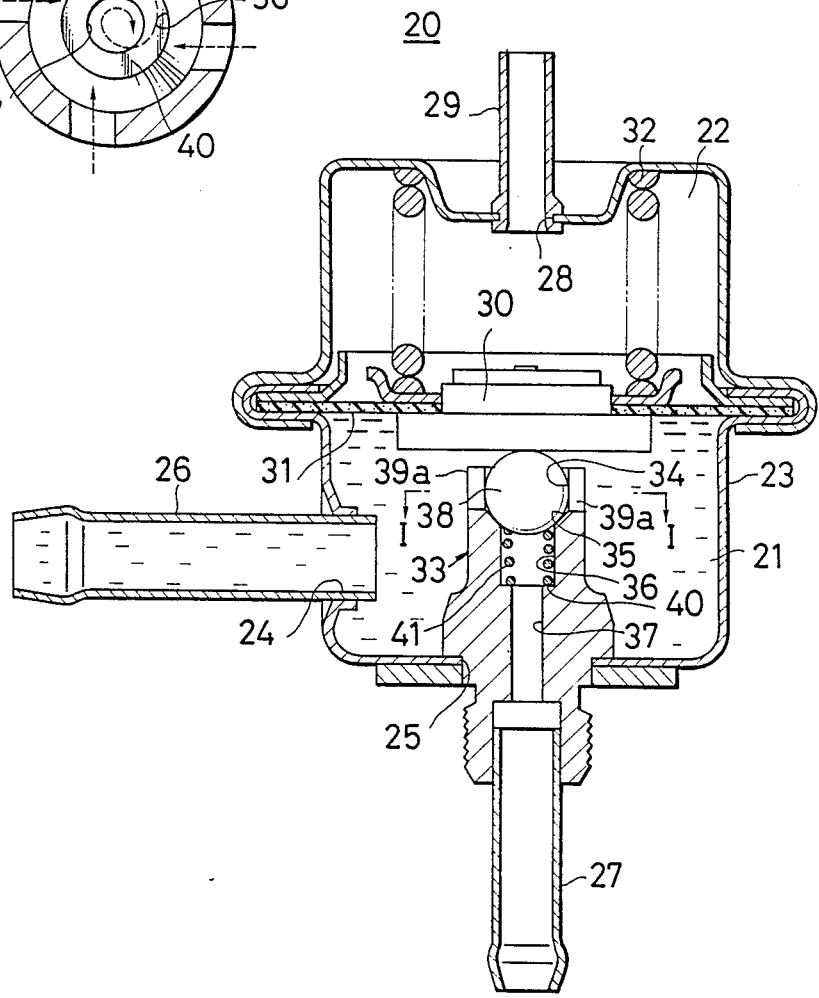
FIG. 4 is a longitudinal sectional view showing the fuel pressure control valve device.

Another embodiment shown in FIGS. 3 and 4 will hereunder be described. In this embodiment, a pipe 27 as being a discharge pipe is connected to an outer end of the fuel passage of the pole 33 which is downwardly projecting from the fuel discharge port 25, i.e. the mounting port. This pipe 27 is connected to the fuel tank, not shown, so that the fuel in the fuel chamber 21 can be returned to the tank through the pipe 27.

A plurality of longitudinal channel 39a constituting auxiliary fuel passages are formed in the side wall of this fuel passage generally equidistantly in the circumferential direction and extended in vertical direction. As shown in FIG. 3 in detail, these longitudinal channels 39a are provided such that the extensions in the radial directions thereof are deviated from the axial center of the fuel passage and parallelly moved from the normal lines of the center to the circumferential direction.

Conically opened at the bottom ends of the group of longitudinal channels 39a is the valve seat 35 which is downwardly tapered with respect to the fuel passage 34. This valve seat 35 is formed so as to abut against the sphere 38 received in the fuel passage 34 for guiding the sphere to prevent the fuel from flowing out.

In this embodiment, since the plurality of longitudinal channels 39a as being the auxiliary fuel passages are formed in the side wall of the fuel passage 34 for guiding the sphere, even if the clearance between the sphere 38 and the fuel passage 34 for guiding the sphere is small, the large fuel flow rate can be discharged through the group of longitudinal channels 39a.

Figure 5:
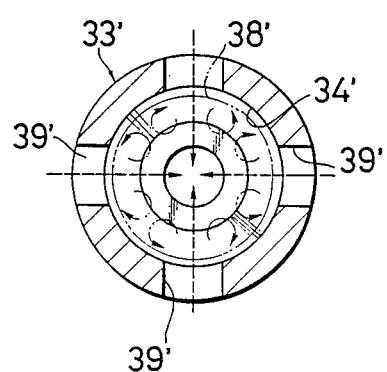
FIG. 5 is an enlarged partially sectional view showing of an example of action of a fuel pressure control valve device.

Now, as shown in FIG. 5, when the longitudinal channels 39' are cuttingly provided in the side wall of the fuel passage 34' for guiding the sphere along the normal lines to the axial center of the fuel passage 34' the fuel flows which have passed through the longitudinal channels run against one another in the fuel passage 34' as indicated by the broken lines in FIG. 5, whereby the turbulent flows are caused, and, thus, the passing flow rate becomes unstable.

However, in this embodiment, as shown in FIG. 3, since the longitudinal channels 39a are deviated from the center of the fuel passage 34 for guiding the sphere, the fuel flows which have passed through the longitudinal channels 39a cause the whirl flow in the fuel passage 34 for guiding the sphere as indicated by a broken line arrow. Due to this whirl flow, the fuel which flowed into the fuel passage flows smoothly and stably into the passages 36 and 37 for discharging the fuel through the valve seat 35 while whirling. As a result, the fuel flow rate passing through all of the fuel passage 34 for guiding the sphere, the group of auxiliary fuel passage 39a, the valve seat 35 and the fuel passages 36 and 37 for discharging the fuel becomes stable, so that the flow rate-pressure characteristics can be further stabilized.

Figure 6:
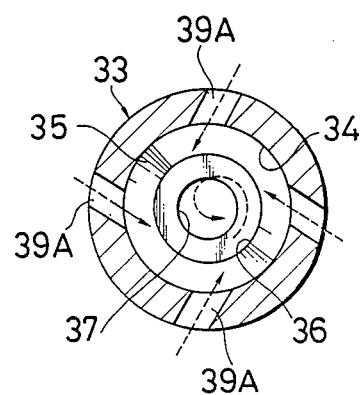
FIGS. 6 and 7 are an enlarged partially sectional view and a partially cutaway, enlarged perspective view, respectively showing modifications of the auxiliary fuel passages.
Figure 7:
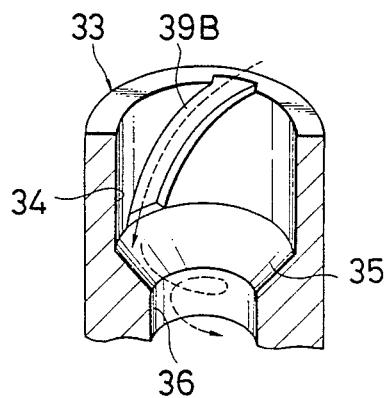

Incidentally, the auxiliary fuel passages need not necessarily be formed by the longitudinal channels shown in FIG. 3, and the modifications shown in FIGS. 6 and 7 may be adopted.

In FIG. 6, a plurality of longitudinal channels 39A as being the auxiliary fuel passages which are inclined to the normal lines are formed in the side wall of the fuel passage 34 for guiding the sphere in such a manner that the longitudinal channels 39A are provided generally equidistantly in the circumferential direction and the extensions of the flow lines of the longitudinal channels are deviated from the center point of the fuel passage 34.

In this embodiment also, as indicated by a broken line arrow in FIG. 6, since the fuel flows which have passed through the longitudinal channels 39A cause the whirl flow in the fuel passage 34, the fuel which has flowed into the fuel passage 34 flows smoothly and stably into the fuel passages 36 and 37 through the valve seat 35 while whirling.

In FIG. 7, a plurality of spiral channels 39B (only one channel is shown in FIG. 7) as being the auxiliary fuel passages are formed on the inner peripheral surface of the side wall of the fuel passage 34 for guiding the sphere in such a manner that the longitudinal channels are cuttingly provided generally equidistantly in the circumferential direction and in spiral forms.

In this embodiment, as indicated by a broken line arrow in FIG. 7, fuel which has flowed into the spiral channels 39B flow along the spiral forms, to thereby cause a whirl flow in the fuel passage 34. As a result, the fuel in the fuel passage 34 flows smoothly and stably into the fuel passage 36 for discharging the fuel through the valve seat 35 while whirling.

According to the embodiments shown in FIGS. 3 to 7, the moving direction of the sphere can be held in the predetermined direction and the large flow rate of the fuel can be caused to flow stably without causing the turbulent flows, so that a stable flow rate of fuel can be discharged in accordance with the position of the armature, thereby contributing to the stabilization of the flow rate-pressure characteristics.

Figure 8:
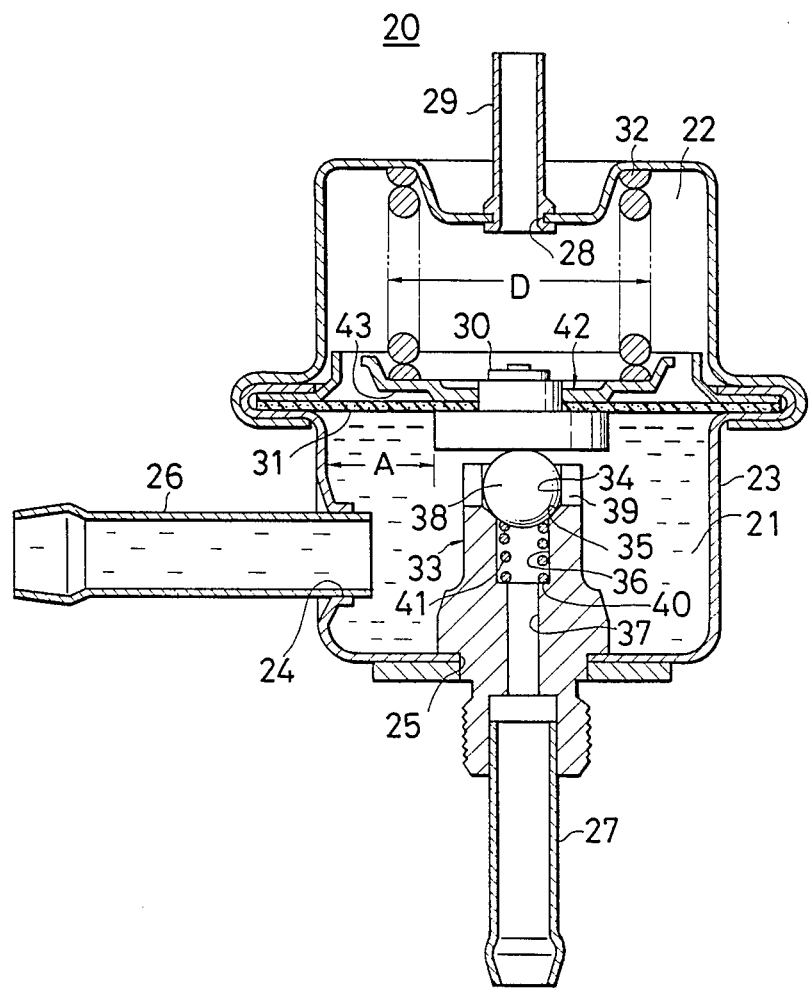
FIG. 8 is a longitudinal sectional view showing a further embodiment of the fuel pressure control valve device according to the present invention.

Still another embodiment of the present invention as shown in FIG. 8 will hereunder be described.

More specifically, in the embodiment shown in FIG. 8, the coil spring 32 is abutted at the top end thereof against the ceiling surface of the pressure chamber 22 and at the armature's side thereof against a spring seat 42, respectively, to thereby bias the armature 30. The spring seat 42 is abutted against the top surface of the diaphragm 31 and movable integrally with the diaphragm 31 and the armature 30 in a state of clamping the diaphragm 31 between the spring seat and the armature. A stepped portion 43 is provided on the outer peripheral portion of this spring seat 42 and formed into a circular ring shape having a predetermined width and a predetermined height in a manner to be separated from the top surface of the diaphragm 31. The coil spring 32 is abutted against the top surface of this stepped portion 43. The diameter of winding of the coil spring 32 is set at a value substantially equal to the outer diameter of the spring seat 42, whereby the spring constant thereof is controlled to a low value.

Now, the follow-up properties of the armature 30 for realizing the above-described valve action are secured by the easiness in flexible deformation of the diaphragm 31. The easiness in flexible deformation of the diaphragm 31 depends upon the flexibly deformable allowance A of the diaphragm 31, i.e. a dimension not clamped by the armature 30 and the spring seat 42 on the outer peripheral portion of the diaphragm 31.

In this embodiment, the spring seat 42 is provided at the outer peripheral portion thereof with the stepped portion 43 to be excessively separated from the diaphragm 42, so that, by this amount, the diaphragm 31 has its flexibly deformable allowance A increased at the outer peripheral portion thereof. This increase in the flexibly deformable allowance A facilitates the diaphragm 31 to be flexibly deformable, thereby enabling the diaphragm to easily follow up the fluctuations in pressure in the pressure chamber 22 and the fuel chamber 21. The diaphragm 31 satisfactorily follows up the fluctuations in pressure, whereby pulsations can be effectively absorbed, so that the rate of damping can be improved.

On the other hand, since the coil spring 32 is received by the top surface of the stepped portion 43 positioned at the outer most peripheral portion of the spring seat 42, a diameter D of winding of the coil spring 32 can be set at a value equal to the almost full outer diameter of the spring seat 41. In short, in this embodiment, the diameter D of winding of the coil spring 32 is not limited to be small by the increase in the flexibly deformable allowance A of the diaphragm 31. In consequence, the diameter D of winding of the coil spring 32 set at a high value makes it possible to set the spring constant of the coil spring at a low value, whereby the pressure gradient can be made satisfactory, so that the rate of damping can be further improved.

Figure 9:
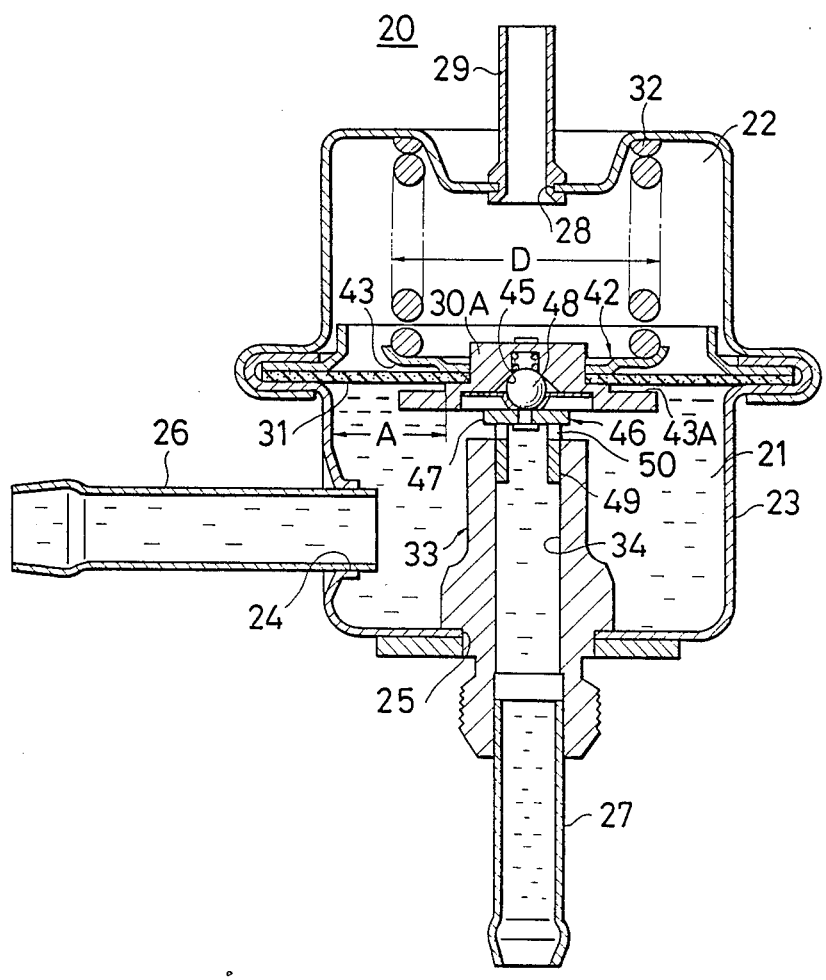
FIG. 9 is a longitudinal sectional view showing a still further embodiment of the present invention.
Figure 10:
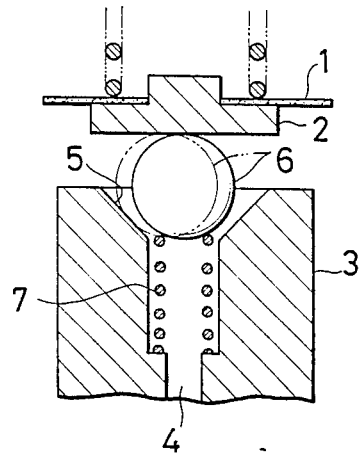
FIG. 10 is a sectional view of the essential portions showing a conventional example.
Figure 11:
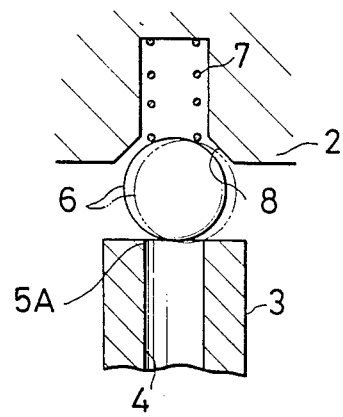
FIG. 11 is a sectional view of the essential portions showing another conventional example.

FIG. 9 is the longitudinal sectional view showing still further embodiment of the fuel pressure control valve device according to the present invention.

This embodiment shown in FIG. 9 is different from the above embodiment shown in FIG. 8 in that a stepped portion 43A is also provided on the side of an armature 30A. More specifically, the armature 30A is recessedly formed therein with a conical recess 45 for holding a valve member 46, so that the outer diameter of the armature 30A is set at a large value. Then, in this embodiment, in addition to the one on the side of the spring seat 42, the stepped portion 43A being of a circular ring shape having a predetermined width and a predetermined height is formed in a manner to be separated from the undersurface of the diaphragm 31.

In this embodiment shown in FIG. 9, the stepped portions 43 and 43A are formed as opposed to each other on the outer peripheral portions of the spring seat 42 and the armature 30A, so that the flexibly deformable allowance A of the diaphragm 31 can be set at a value as large as an amount of separation between the pair of stepped portions 43 and 43A irrespective of that armature 30A has a large diameter. Due to the increase in the flexibly deformable allowance A of this diaphragm 31, this embodiment can obtain the same action and effects as the above embodiment shown in FIG. 8 does.

In passing, the valve member 46 includes: a valve body 47 for opening or closing a top end opening of the fuel passage 34; a generally spherical projection 48 projecting from the top surface of the valve body 47; a guide portion 49 slidably coupled into the fuel passage 34; and T-letter shaped discharge paths 50 which are opened in the guide portion 49. The projection 48 of the valve member 46 is coupled into the recess 45 formed in the armature 30A.

Thus, according to the embodiments shown in FIGS. 8 and 9, the stepped portion is formed on the outer peripheral portion of the spring seat in a manner to be separated from the diaphragm, so that the flexibly deformable allowance of the diaphragm can be increased and the spring constant of the coil spring can be lowered, thereby improving the rate of damping.

Incidentally, the present invention need not be limited to the above embodiments and, needless to say that various modifications can be adopted within the scope of the present invention, not departing from the gist of it.

For example, shapes, constructions and the like of the valve body, valve seat and fuel passages need not be limited to the above embodiments and may be suitably selected in accordance with the conditions to be controlled and the like.

What is claimed is:

1. A fuel pressure control valve device comprising,
   a case constituting a fuel chamber and a pressure chamber,
   a fuel introducing port and a fuel discharge port, in said case at said fuel chamber,
   a pressure introducing port in said case at said pressure chamber,
   a flexible diaphragm provided between the fuel chamber and the pressure chamber so as to divide the interior of said case into two chambers,
   an armature supported by the diaphragm and inserted into the fuel chamber,
   a pole provided in the fuel chamber and a fuel passage formed in the pole for leading fuel in the fuel chamber to the fuel discharge port, said fuel passage having a central axis,
   a sphere disposed between the pole and the armature, for opening or closing the fuel passage in the pole in accordance with movement of the armature,
   resilient means in said case for biasing the armature toward the fuel chamber, and for biasing the sphere toward said armature, and
   said fuel passage of the pole includes,
   a first cylindrical fuel passage section for guiding the sphere, with the diameter of the first fuel passage section being larger than the diameter of the sphere by a first predetermined amount sufficient to allow the sphere to be slidable in the first fuel passage section, a valve seat formed in the first fuel passage section and having a valve seat opening with a diameter smaller by a second predetermined amount than the diameter of the first fuel passage section to permit abutting contact of the valve seat with the sphere to prevent the fuel from flowing out of the first fuel passage section, a second fuel passage section for discharging the fuel, extending from said valve seat to the fuel discharge port of said case, and a plurality of auxiliary fuel passages formed in said first fuel passage section such that the flow paths from said auxiliary fuel passages deviate from said central axis to develop a whirl flow of fuel from said auxiliary fuel passages.

2. A fuel pressure control valve device as set forth in claim 1, wherein a spring seat is joined to said armature for insertion in said pressure chamber and said resilient means includes a coil member provided in the pressure chamber for biasing the armature toward the fuel chamber through said spring seat, and said spring seat includes an outer peripheral portion stepped away from and separated from the diaphragm, and the outer peripheral stepped away portion receives said coil member.

3. A fuel pressure control valve device comprising:
   a case constituting a fuel chamber and a pressure chamber;
   a fuel introducing port and a fuel discharge port, which are opened on the side of the fuel chamber of said case;
   a pressure introducing port opened on the side of the pressure chamber of said case;
   a diaphragm stretchingly provided between the fuel chamber and the pressure chamber so as to divide the interior of said case into two chambers;
   an armature supported by the diaphragm and inserted into the fuel chamber, said armature having a flat engaging surface on the side of the fuel chamber;
   a first resilient member for biasing the armature toward the fuel chamber;
   a pole provided so as to form therein a fuel passage for leading the fuel in the fuel chamber to the fuel discharge port of said case; and
   a sphere disposed between the pole and the armature, for opening or closing the fuel passage in the pole in accordance with the movement of the armature;
   wherein said fuel passage of the pole includes:
   a first fuel passage section for guiding the sphere, with the diameter thereof being slightly larger than the diameter of the sphere to allow the sphere to be slidable in the first fuel passage section;
   a valve seat formed to have a diameter smaller than that of said first fuel passage section for guiding the sphere, for abuttingly contacting the sphere to prevent the fuel from flowing out of the first fuel passage section; and
   a second fuel passage section for discharging the fuel, being formed for leading the fuel from said valve seat to the fuel discharge port of said case; and
   the sphere is slidably inserted into the first fuel passage section for guiding the sphere, and a second resilient member for giving a biasing force for constantly contacting the sphere with the flat engaging surface of the armature is provided in the second fuel passage section for discharging the fuel;

and wherein auxiliary fuel passages to generate a whirl flow of fuel are formed in the first fuel passage section for guiding the sphere, said first fuel passage section having an axis and said auxiliary fuel passages being formed such that their flow paths deviate from the axis of the first fuel passage section for guiding the sphere.

4. A fuel pressure control valve device as set forth in claim 3, wherein said auxiliary fuel passages are formed by longitudinal channels cuttingly provided at the opening end portion of said pole, and said longitudinal channels have their extensions in the radial directions deviated from the axis of the first fuel passage section for guiding the sphere.

5. A fuel pressure control valve device as set forth in claim 3, wherein said auxiliary fuel passages are formed as spiral channels cuttingly provided on the inner peripheral surface of said pole.

6. A fuel pressure control valve device as set forth in claim 3, wherein a spring seat is joined to said armature for insertion in said pressure chamber and said first resilient member is a coil member provided in the pressure chamber, for biasing the armature toward the fuel chamber through said spring seat; and said spring seat includes an outer peripheral stepped portion, stepped away from and separated from the diaphragm, and the outer peripheral stepped away portion receives said coil member.

7. A fuel pressure control valve device as set forth in claim 6, wherein auxiliary fuel passages formed in the wall surface of the first fuel passage section for guiding the sphere are provided, and said auxiliary fuel passages are formed such that their flow paths deviate from the axis of the first fuel passage section for guiding the sphere, so that a whirl flow can be formed by fuel flows which have passed through said auxiliary fuel passages.

8. A fuel pressure control valve device as set forth in claim 7, wherein said auxiliary fuel passages are formed by longitudinal channels cuttingly provided at the opening end portion of said pole, and said longitudinal channels have their extensions in radial directions deviated from the axis of the first fuel passage section.

9. A fuel pressure control valve device as set forth in claim 7, wherein said auxiliary fuel passages are formed by spiral channels cuttingly provided on the inner peripheral surface of said pole.

10. A fuel pressure control valve device comprising:

a case constituting a fuel chamber and a pressure chamber;

a fuel introducing port and a fuel discharge port, which are opened on the side of the fuel chamber of said case;

a pressure introducing port opened on the side of the pressure chamber of said case;

a diaphragm stretchingly provided between the fuel chamber and the pressure chamber so as to divide the interior of said case into two chambers;

an armature supported by the diaphragm and inserted into the fuel chamber, said armature having a flat engaging surface on the side of the fuel chamber;

a first resilient member for biasing the armature toward the fuel chamber;

a pole provided so as to form therein a fuel passage for leading the fuel in the fuel chamber to the fuel discharge port of said case; and a sphere disposed between the pole and the armature, for opening or closing the fuel passage in the pole in accordance with the movement of the armature;

wherein said fuel passage of the pole includes:

a first fuel passage section for guiding the sphere, with the diameter thereof being slightly larger than the diameter of the sphere to allow the sphere to be slidable in the first fuel passage section;

a valve seat formed to have a diameter smaller than that of said first fuel passage section for guiding the sphere, for abuttingly contacting the sphere to prevent the fuel from flowing out of the first fuel passage section; and a second fuel passage section for discharging the fuel, being formed for leading the fuel from said valve seat to the fuel discharge port of said case; and the sphere is slidably inserted into the first fuel passage section for guiding the sphere, and a second resilient member for giving a biasing force for constantly contacting the sphere with the flat engaging surface of the armature is provided in the second fuel passage section for discharging the fuel;

and wherein a spring seat is joined to said armature for insertion in said pressure chamber, and said first resilient member is a coil member provided in the pressure chamber, for biasing the armature toward the fuel chamber through said spring seat, and said spring seat includes an outer peripheral stepped portion, stepped away from and separated from the diaphragm, and the outer peripheral stepped away portion receives said coil member.

* * * * *